United States Patent
Nebel

(10) Patent No.: US 12,077,135 B2
(45) Date of Patent: Sep. 3, 2024

(54) TIRE ENGAGING PARKING BRAKE

(71) Applicant: Lippert Components, Inc., Elkhart, IN (US)

(72) Inventor: Michael W. Nebel, Salina, KS (US)

(73) Assignee: LIPPERT COMPONENTS, INC., Elkhart, IN (US)

(*) Notice: Subject to any disclaimer, the term of this patent is extended or adjusted under 35 U.S.C. 154(b) by 0 days.

(21) Appl. No.: 17/892,762

(22) Filed: Aug. 22, 2022

(65) Prior Publication Data
US 2023/0053558 A1     Feb. 23, 2023

Related U.S. Application Data

(60) Provisional application No. 63/236,018, filed on Aug. 23, 2021, provisional application No. 63/241,867, filed on Sep. 8, 2021.

(51) Int. Cl.
| | |
|---|---|
| *B60T 1/04* | (2006.01) |
| *B60T 11/04* | (2006.01) |
| *F16D 49/00* | (2006.01) |
| *F16D 65/16* | (2006.01) |
| *F16D 121/14* | (2012.01) |
| *F16D 125/64* | (2012.01) |

(52) U.S. Cl.
CPC .............. *B60T 1/04* (2013.01); *B60T 11/04* (2013.01); *F16D 49/00* (2013.01); *F16D 65/16* (2013.01); *F16D 2121/14* (2013.01); *F16D 2125/64* (2013.01)

(58) Field of Classification Search
None
See application file for complete search history.

(56) References Cited

U.S. PATENT DOCUMENTS 2,738,034 A * 3/1956 Levine ................ B66F 9/07509
                                                            188/29
2,864,464 A * 12/1958 Booth ....................... F16N 7/34
                                                            261/78.2

(Continued)

FOREIGN PATENT DOCUMENTS

| CN | 104670183 | 6/2015 |
|---|---|---|
| GB | 738908 | 10/1955 |

(Continued)

*Primary Examiner* — Melanie Torres Williams
(74) *Attorney, Agent, or Firm* — NIXON & VANDERHYE P.C.

(57) ABSTRACT

A tire engaging brake for use with a vehicle having a vehicle frame supporting a tire from a suspension includes a base securable to the vehicle frame, a brake pad mounting arm pivotally connected to the base, and a brake pad connected to the brake pad mounting arm. An over-center linkage has an inner link pivotally connected at an inner end to the base at a position spaced from the pivotal connection of the brake pad mounting arm to the base. An outer link of the over-center linkage is pivotally connected at an inner end to the inner link and is pivotally connected at an outer end to the brake pad mounting arm. A lever arm is cooperable with the inner link for pivoting the inner link, the outer link and the brake pad mounting arm between a retracted position and a tire engaging position in which the inner link and the outer link extend in an over-center condition.

18 Claims, 14 Drawing Sheets

(56) References Cited

U.S. PATENT DOCUMENTS

| | | | |
|---|---|---|---|
| 3,388,419 A * | 6/1968 | Crawford | B60B 33/021 |
| | | | 16/35 R |
| 3,722,631 A | 3/1973 | Lowrie | |
| 4,828,076 A | 5/1989 | Fox | |
| D347,821 S | 6/1994 | Few | |
| 5,566,788 A * | 10/1996 | Smith | B60B 33/0081 |
| | | | 188/1.12 |
| 6,425,465 B1 | 7/2002 | Tallman et al. | |
| 6,983,827 B2 * | 1/2006 | Swift | F16D 49/00 |
| | | | 188/19 |
| 7,503,195 B2 | 3/2009 | Vegvary | |
| 8,365,875 B2 | 2/2013 | Garceau | |
| 8,567,570 B2 | 10/2013 | Junk et al. | |
| 8,827,047 B2 * | 9/2014 | Baker | B60T 1/14 |
| | | | 188/4 R |
| RE46,876 E | 5/2018 | Garceau | |
| 10,328,838 B2 | 6/2019 | Yim et al. | |

FOREIGN PATENT DOCUMENTS

| | | |
|---|---|---|
| GB | 1139796 | 1/1969 |
| JP | 09299411 A * | 11/1997 |

* cited by examiner

TIRE ENGAGING PARKING BRAKE

CROSS-REFERENCES TO RELATED APPLICATIONS

This application claims the benefit of U.S. Provisional Patent Application No. 63/236,018, filed Aug. 23, 2021 and U.S. Provisional Patent Application No. 63/241,867, filed Sep. 8, 2021, the entire contents of both of which are herein incorporated by reference.

BACKGROUND OF THE INVENTION

This invention relates to tire engaging parking brakes for vehicles and, more particularly, to tire engaging parking brakes adapted for trailers.

The need to prevent trailers from rolling when not secured to a towing vehicle is well known. A common approach is to use wheel chocks to block the wheels from rolling in either direction. Examples of wheel chocks are shown in U.S. Pat. No. 4,828,076 of Fox, U.S. Pat. No. 6,425,465 of Tallman et al. and U.S. Pat. No. 8,365,875 of Garceau. Wheel chocks are typically stored on the trailer or the towing vehicle when not in use, taking up limited space and requiring additional time and effort to deploy. In addition, if not promptly stored after moving the wheel chocks away from blocking the trailer wheels, the wheel chocks are frequently left behind and not available for use at a subsequent stop such as a campsite for a travel trailer or trailer mounted camper.

It is also known to use wheel engaging brakes mounted on a trailer or a cart for selectively engaging one or more wheels to prevent the trailer from rolling or moving. Examples of wheel brakes are shown in U.S. Pat. No. 7,503,195 of Vegvary and U.S. Pat. No. 8,567,570 of Junk et al. Wheel brakes are not known to be currently in use with trailers in the nature of campers, which may be due to difficulties in mounting a wheel brake to the frame of the trailer and maintaining the wheel brake in a disengaged position when not in use.

There remains a need for a wheel brake adapted for use with travel trailers or campers that is easy to operate and can be mounted as original equipment or an after-market product.

SUMMARY

The described embodiments are directed to tire engaging parking brakes for use with vehicles and are particularly well adapted for use with trailers including travel trailers or campers as well as boat or equipment trailers. The tire brake includes a brake pad mounted on a brake pad mounting arm that is pivotally connected at an inner end to a base mounted on the frame of a trailer using a mounting assembly. An over center linkage, with an inner link and an outer link, is connected between the distal end of the brake pad mounting arm and the base in front of the brake pad and is operable using a lever arm to pivot the brake pad mounting arm between retracted and extended positions. In the extended position, the brake pad engages the tread of the tire and the over center linkage is advanced to a locked, over center condition. In the retracted position, the brake pad mounting arm and attached brake pad are pivoted forwardly and away from the tire so as not to interfere with rotation of the tire.

A diagonal brace may be connected at an outer end to the distal end of the brake pad mounting arm proximate the brake pad, and an inner end of the diagonal brace is spaced above the inner end of the brake pad mounting arm. A frame mounting bracket is pivotally connected at an outer end to the inner end of the diagonal brace. An inner end or flange of the frame mounting bracket is connected to the beam 21. The inner end of the diagonal brace is supported in spaced relation above the inner end of the brake pad mounting arm and the base by a spacer surrounding a pivot rod around which the inner end of the brake pad mounting arm is pivotally connected to the base. The base is securable to the vehicle frame such that the lever arm is pivotal below the vehicle frame when the brake pad mounting aim, the inner link and the outer link are pivoted to the retracted position.

At least one pin receiver is formed in the base and sized to receive a pin therethrough. As used herein, the pin may be a shackle of a padlock or a wire lock pin Of other securement pin. The at least one pin receiver is positioned to extend forward of the inner link when the inner link is pivoted to the tire engaging position. Positioning of a pin through the at least one pin receiver forward of the inner link prevents forward pivoting of the inner link, the outer link, the brake pad mounting arm and the brake pad connected thereto out of the tire engaging position. The at least one pin receiver is preferably also positioned to extend rearward of the brake pad mounting arm when the brake pad mounting arm is pivoted to the retracted position. Positioning a pin through the at least one pin receiver rearward of the brake pad mounting arm in the retracted position prevents rearward pivoting of the inner link, the outer link, the brake pad mounting arm and the brake pad connected thereto into the tire engaging position. The at least one pin receiver may comprise a single slot.

In one embodiment, the lever arm extends through a slot formed in the inner link and is pivotally connected to the inner link. A distal end of the lever arm is engageable, by a user and movable in a first direction for pivoting the inner link and the outer link and the brake pad mounting arm connected thereto from a retracted position to a tire engaging position. In the tire engaging position, the inner link and the outer link extend in an over-centered condition, and the brake pad mounting arm supports the brake pad in engagement against the tire. Pivoting the lever arm in a second direction, when the inner link, outer link and brake pad mounting arm are in the tire engaging position, pivots an inner end of the lever arm against the abutment surface of the brake pad mounting arm to facilitate pivoting of the inner link out of the over-center condition with the outer link. Further pivoting of the lever arm, pivots the brake pad mounting arm and the attached brake pad out of the tire engaging position.

BRIEF DESCRIPTION OF THE DRAWINGS

These and other aspects and advantages will be described in detail with reference to the accompanying drawings, in which.

DETAILED DESCRIPTION

Figure 1:
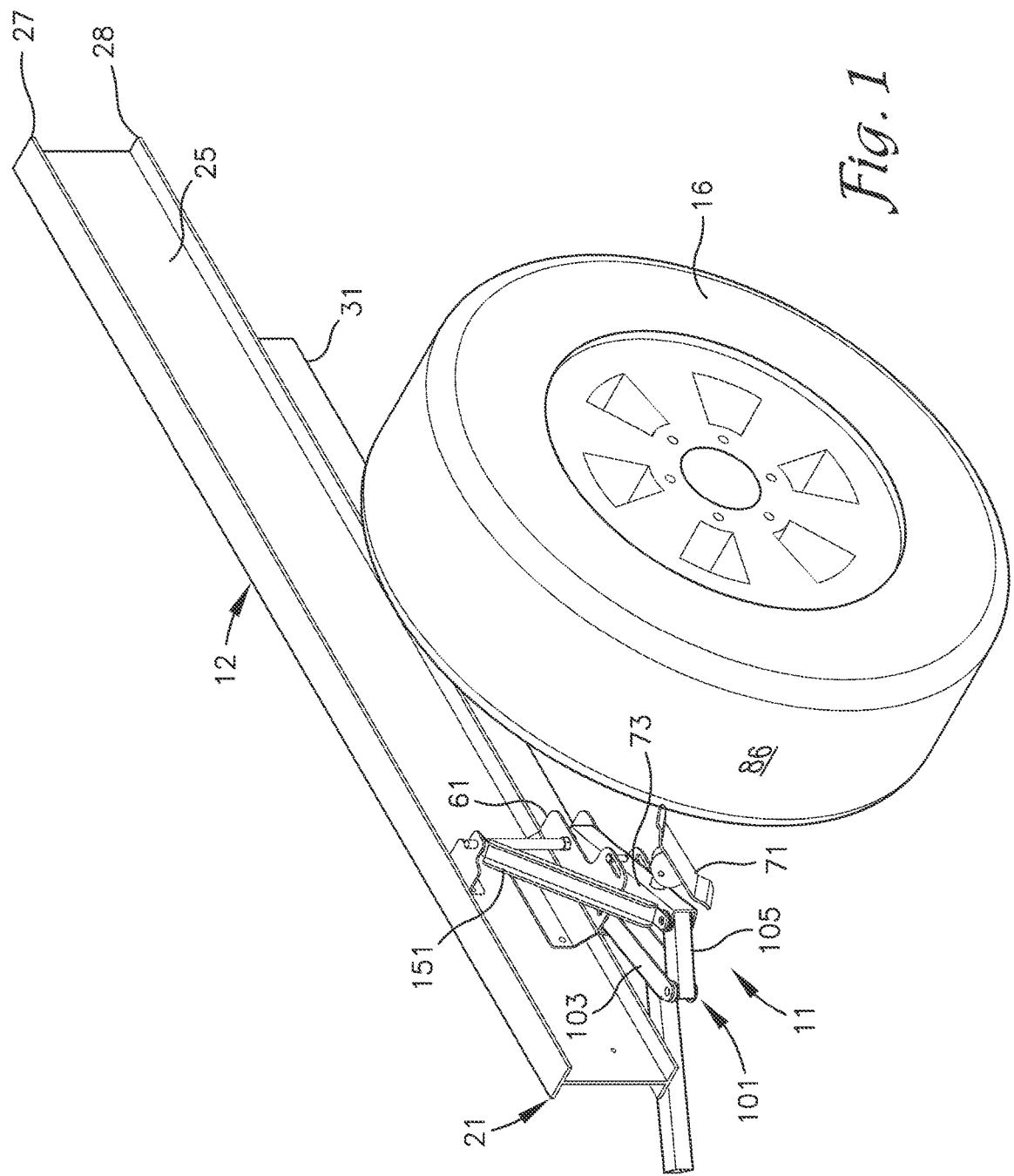
FIG. 1 is a front, top perspective view looking inward at a portion of a trailer frame supported on a tire by a suspension (not shown) with a tire engaging brake shown in a retracted position.

Detailed embodiments are disclosed herein, and it is to be understood that the disclosed embodiments are merely exemplary, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, and in particular FIGS. 1-8, tire engaging brake or tire brake 11 is adapted to be secured to the frame or frame assemblies of a recreational vehicle such as left and right frame assemblies 12 (one of which is shown) of a travel trailer or the like. The tire brake 11 selectively engages and resists rotation of a tire 16 associated with a respective frame assembly 12. Directional references included herein are in reference to the tire brake 11 secured to the frame assemblies 12 of a travel trailer when parked on a horizontal surface. A conventional travel trailer is supported on tires 16 which are connected to the left and right frame assemblies 12 by a suspension or suspension system (not shown). The suspension system is adapted to provide a smooth ride during travel.

The left and right frame assemblies 12 of commonly available travel trailers each generally comprise a main beam 21 which is reinforced in the area where the suspension is connected to the beam 21. The main beam 21 is typically formed from an I-beam or channel having a vertical web 25 and upper and lower flanges 27 and 28 which extend horizontally. Commonly used reinforcements include a square tube 31 welded to the lower flange 28 of the beam 21, as shown in FIG. 1. It is also known to weld a metal flat or strap at an angle of approximately 45 degrees between the outer edge of the lower flange 28 and the web 25 to reinforce the lower flange 28.

A typical suspension utilized on trailer mounted campers or boat trailers comprises a leaf spring or leaf spring assembly connected on opposite ends to a respective left or right frame assembly 12. A front spring eye of the leaf spring is pivotally mounted on a pivot pin supported below the frame assembly 12 by a front hanger which may be welded to the bottom of the suspension support tube 31 proximate a front end thereof. A rear spring eye is pivotally mounted on a shackle pivotally connected to a rear hanger welded to the bottom of the suspension support tube 31 proximate a rear end thereof. An axle case surrounding an axle on which tires 16 are mounted is connected to a center portion of the leaf spring using a U-bolt and axle case bearing.

Figure 5:
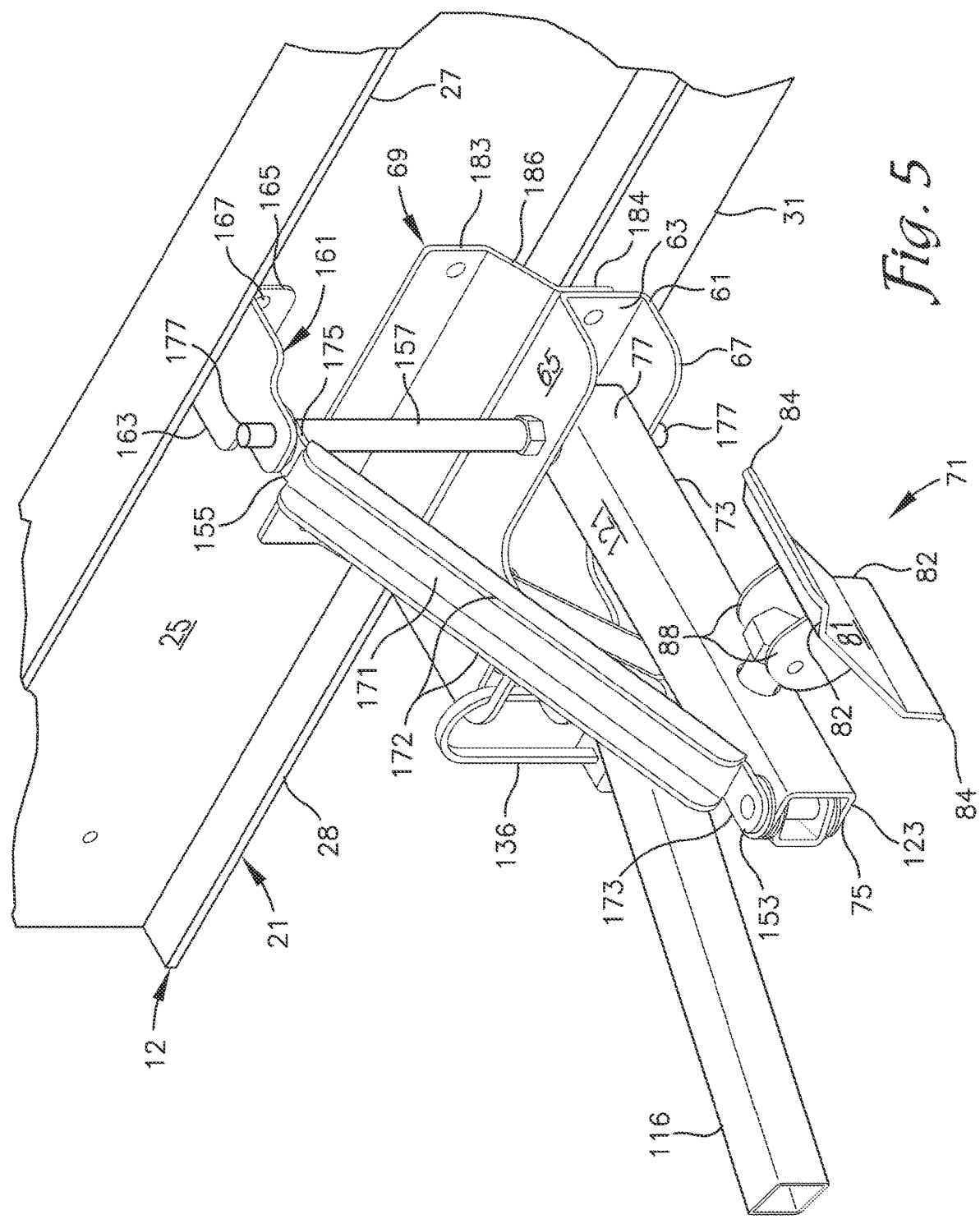
FIG. 5 is a rear, top perspective view of the tire engaging brake secured to the frame as shown in FIG. 3 with the tire and a cheater bar removed.

For camper type trailers, one tire brake 11 is mounted on each of the left and right frame assemblies 12 in relatively closely spaced relation in front of the tire 16 associated therewith. As best seen in FIG. 5, each tire brake includes a base or base channel 61, which in the embodiment shown, is formed from a U shaped or C-shaped channel oriented sideways with a channel web 63 extending vertically and the legs of the base channel 61 oriented horizontally to form an upper leg 65 and lower leg 67. A brake mounting assembly 69 is connected to the base channel 61 to provide structure for connecting the base channel 61 to the respective frame assembly 12. Preferred embodiments of the brake mounting assembly 69 will be described in more detail hereafter.

The tire brake 11 further includes brake pad 71 mounted on a brake pad mounting arm 73 near or proximate a distal end 75 thereof. Although one brake pad 71 is shown, it is to be understood that more than one brake pad or tire engaging member or structure could be attached to the brake pad mounting arm 73 to engage the tire 16. For example, two tire engaging feet could be mounted in laterally spaced alignment on the brake pad mounting arm 73. An inner end 77 of the brake pad mounting arm 73 is pivotally connected to the base channel 61 between the upper and lower legs 65 and 67. The brake pad 71 shown is formed with a central web 81, two outwardly and rearwardly projecting angled legs 82 and a foot 84 projecting outward from the distal end of each leg 82 to extend generally parallel with the central web 81. The feet 84 are adapted to be pressed against a tread or tread surface 86 of the tire 16 to grip the tire tread 86 to prevent or resist rotation of the tire 16. Ears 88 (FIGS. 5 and 6) connected to and projecting outward or forward from the central web 81 on a side opposite the feet 84 are pivotally connected to a head 91 of a threaded connector or bolt 93. The threaded connector 93 is threaded into a threaded receiver 95 formed in or mounted on the brake pad mounting arm 73 to allow adjustment of the spacing of the feet 84 of the brake pad 71 relative to the mounting arm 73. The pivotal connection of the brake pad 71 to the threaded connector 93 allows the pad 71 to be rotatable to orient one foot 84 above the other and further rearward from the mounting arm 73 to match the contour of the portion of the tire tread 86 against which it is pressed. The outward spacing of the feet 84 relative to the central web 81 by angled legs 82 provides space to accommodate the curved surface of the tread 86 extending between the feet 84 pressed against the tread 86.

A lever actuated, over center linkage 101 is connected between the base channel 61 and the distal end 75 of the brake pad mounting arm 73 and forward of the mounting arm 73. The over center linkage 101 includes an inner link 103 and an outer link 105. In the embodiment shown, the mounting arm 73, inner link 103 and outer link 105 are each formed from as C-shaped channel members. An inner end of the inner link 103 is pivotally connected to the upper and lower legs 65 and 67 of the base channel 61 forward of the pivotal connection of the brake pad mounting arm 73 to the base channel 61 and proximate a forward end of the base channel 61. A distal end of the inner link 103 is pivotally connected to an inner end of the outer link 105 and the outer end of the outer link 105 is pivotally connected to the distal end 75 of the brake pad mounting arm 73.

In the embodiment shown, a notch 107 is formed on the distal end of the inner link 103 to allow pivoting of the inner end of the outer link 105 relative to the outer end of the inner link 103. More specifically, notch 107 is formed between upper and lower ears 109 and 110 on the distal ends of upper and lower legs 111 and 112 of the C-channel forming inner link 103 with the ears 109 and 110 projecting outward past a distal end of web 114 of the C-channel forming inner link 103. A lever arm 116 is connected at its inner end to the forward facing surface of web 114 of the inner link 103 proximate the distal end thereof. The lever arm 116 extends at an acute angle relative to the inner link 103 and away from the point of pivotal connection of the inner link 103 to the base channel 61. As generally seen in FIG. 3, the lever arm 116 is sized not to extend past a plane extending across an outer face of the tire 16 when the brake pad mounting arm 73 is pivoted to advance the brake pad 71 into engagement with the tire 16.

An extension bar or cheater bar 118 is removably securable or coupled to the lever arm 116 to provide greater leverage in operating the linkage 101 to press the brake pad 71 against the tire 16 or release the brake pad 71 from engagement with the tire 16. In the embodiment shown, the lever arm 116 is formed form a square tube and the extension bar 118 is formed as a length of a square tube or a square bar that is smaller in width than the square tube forming the lever arm 116 such that an end of the extension bar 118 can be slid into the open, distal end of the lever arm 116.

Figure 2:
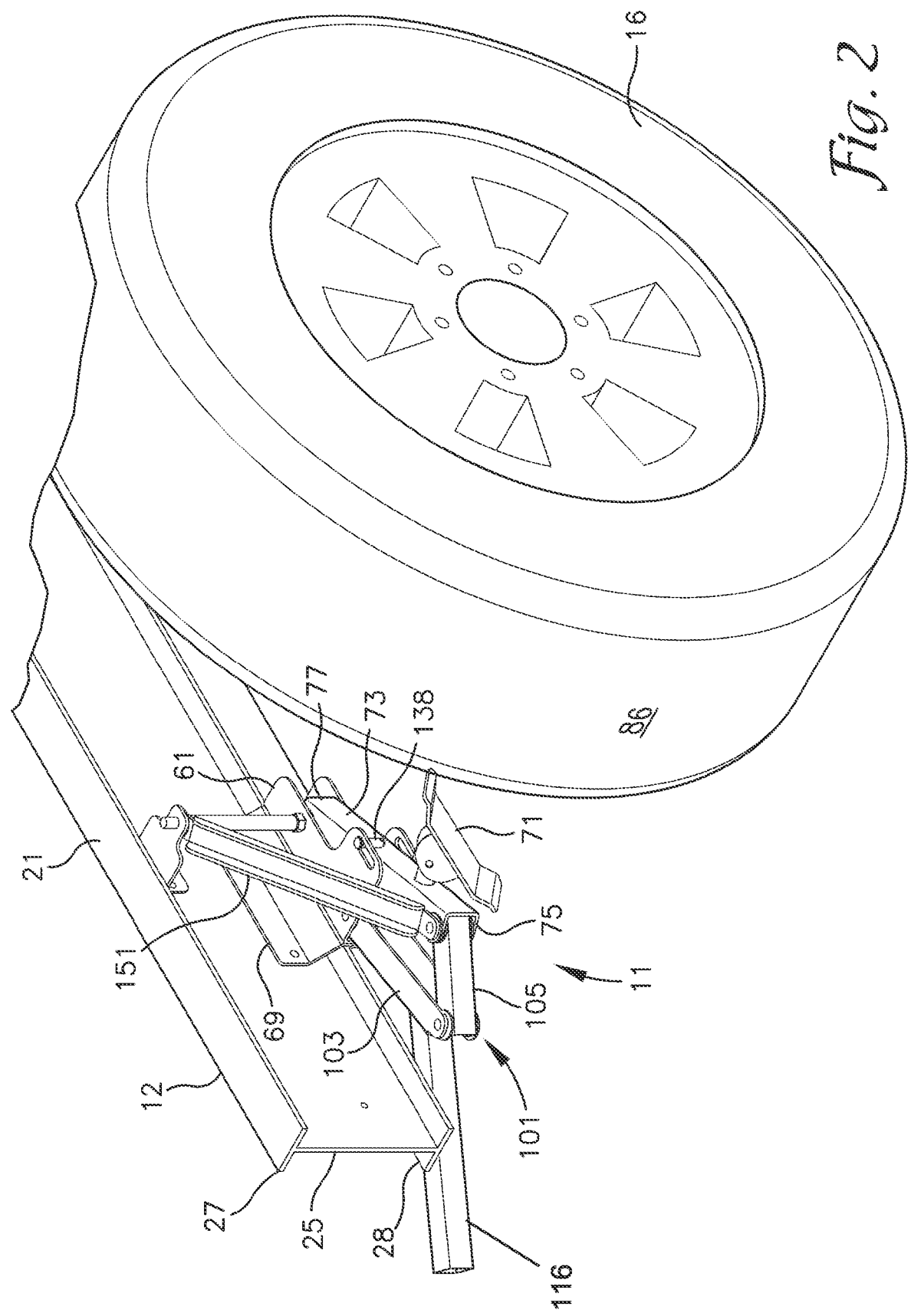
FIG. 2 is an enlarged and fragmentary view of the tire engaging brake as in FIG. 1 in the retracted position.
Figure 3:
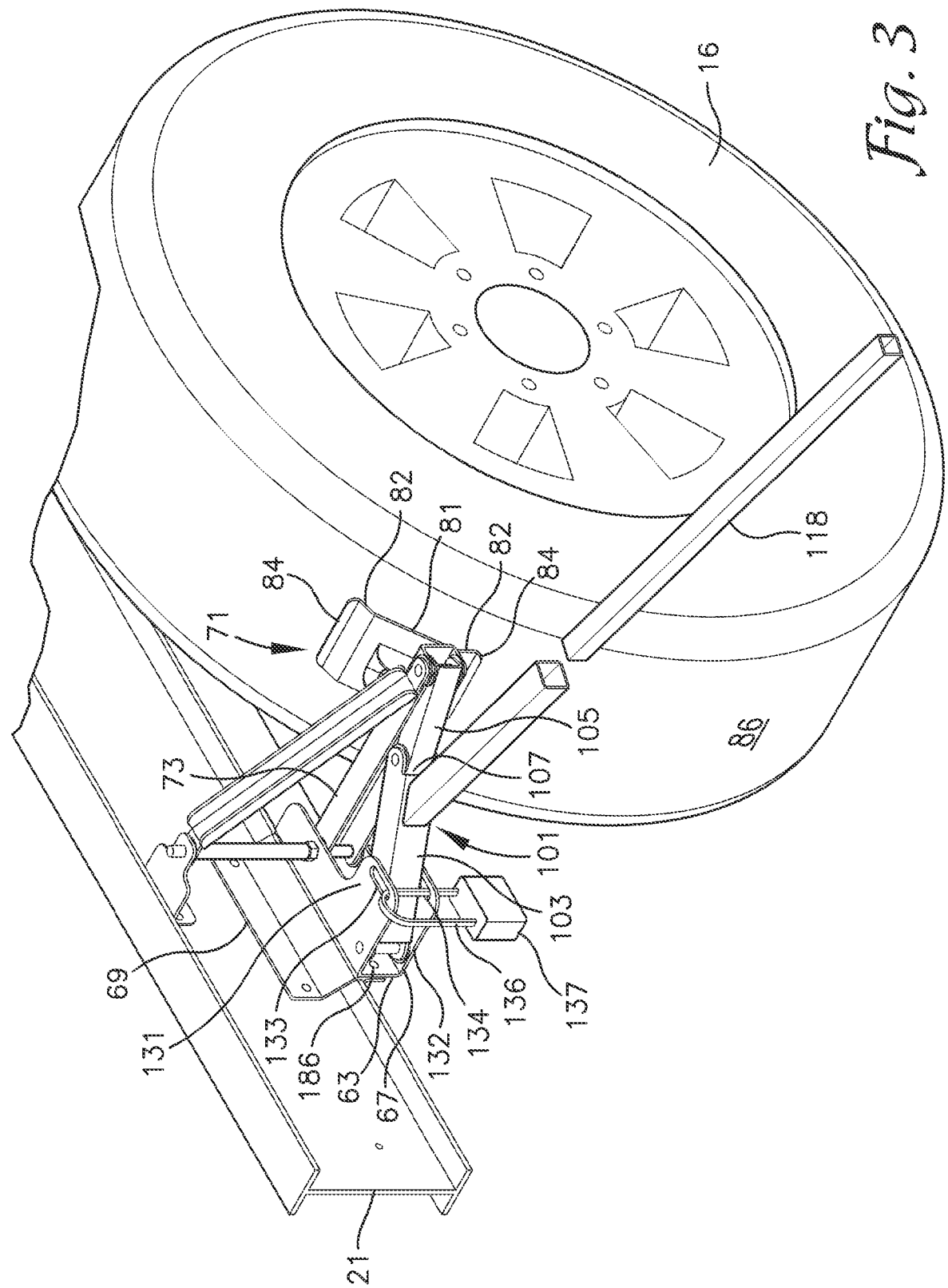
FIG. 3 is a front, top perspective view of the tire engaging brake as in FIG. 1 showing the brake engaging a tire and a cheater bar for facilitating engagement and disengagement of the tire brake.
Figure 4:
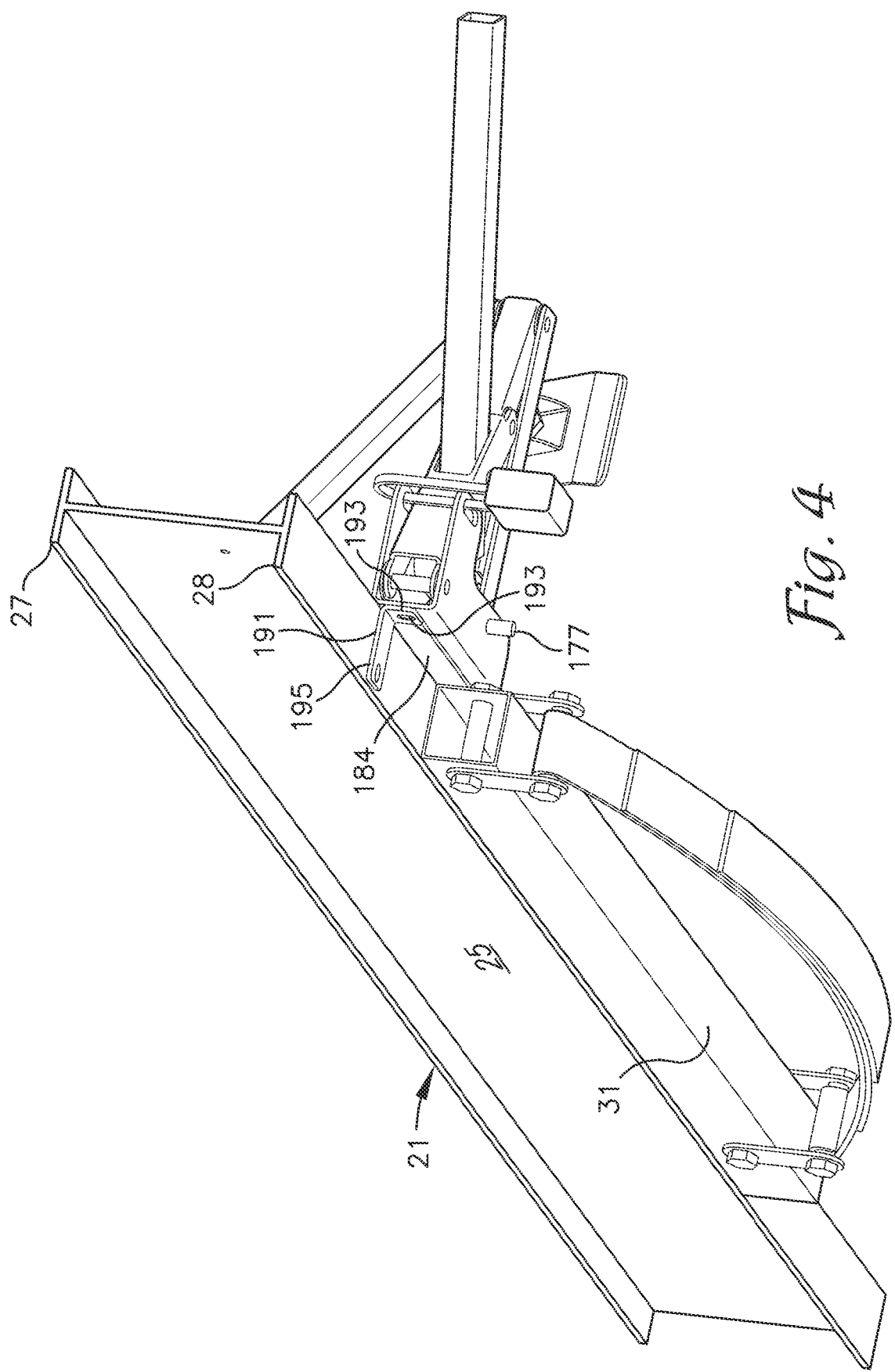
FIG. 4 is a front, bottom perspective view looking outward at a portion of the trailer frame with the tire engaging brake secured thereto as in FIG. 3 with the tire and the cheater bar removed.

Using the lever arm 116 acting on the over center linkage 101, the brake pad mounting arm 73 and attached brake pad 71 are pivotal between a retracted or stowed position as shown in FIGS. 1 and 2 and an extended or tire engaging position as shown in FIG. 3. In the tire engaging position of the embodiment shown, the mounting arm 73 extends approximately perpendicular to the base channel 61 with the brake pad 71 engaging the tread 86 of the tire 16. In the retracted position, the brake pad mounting arm 73 and attached brake pad 71 are pivoted away and forward from and the tread 86 of tire 16. As will be discussed in more detail hereafter, and with reference to FIG. 7, the brake mounting assembly 69 connects the base channel 61 to the beam 21 so that the upper leg 111 of inner link 103 connected to base channel 61 generally extends in planar alignment with the lower flange 28 of the beam 21 and an upper surface of the lever arm 116 extends below the upper leg 111 of the inner link 103 to which it is connected. When the brake pad mounting arm 73 and over center linkage 101 are pivoted to the retracted position as shown in FIGS. 1 and 2, at least a portion of the lever arm 116 can be advanced under the beam 21.

The base channel 61, brake pad mounting arm 73 and inner and outer links 103 and 105 may be described as an over-center, four bar linkage. When the brake pad mounting arm 73 and links 103 and 105 are in the retracted position, the inner link 103 of linkage 101 and the mounting arm 73 are angled forward from the tread 86 of the tire 16 or the rear end of the base channel 61 at an obtuse angle relative to the base channel 61 approaching 180 degrees. The outer link 105 extends at an acute angle relative to the inner link 103 and rearward from the distal end of the inner link 103 back to the distal end of the mounting arm 73 and at an obtuse angle relative to the mounting arm 73.

Figure 6:
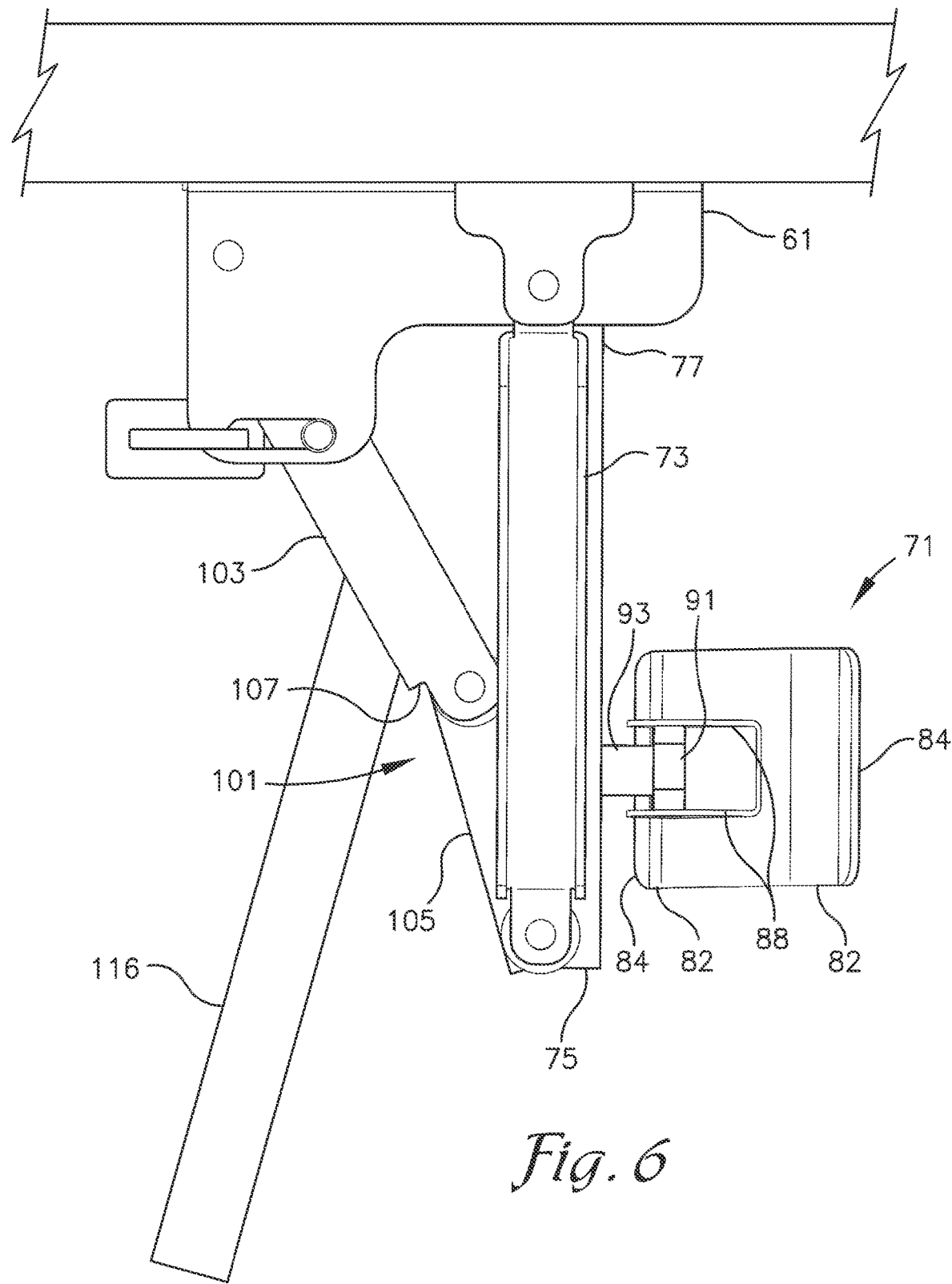
FIG. 6 is a top plan view of the tire engaging brake as shown in FIG. 5.

As the brake pad mounting arm 73 and over center linkage 101 are pivoted to the engaged position by advancing or urging the lever arm 116 outward and rearward relative to the base channel 61, the inner link 103 and brake pad mounting arm 73 pivot outward and then rearward relative to the base channel 61. As the inner link 103 and mounting arm 73 pivot outward and rearward, the angle between the outer link 105 and inner link 103 increases and the angle between the outer link 105 and mounting arm 73 decreases. When the mounting arm 73 extends approximately perpendicular to the base channel 61, the outer link 105 extends in axial alignment with the inner link 103, and the angle between the outer link 105 and inner link 103 is zero. Further rearward pivoting of the lever arm 116 and inner link 103 advances the inner link 103 and outer link 105 into an over center condition, as shown in FIG. 6, in which the outer link 105 is angled at an obtuse angle forwardly relative to the inner link 103 and a portion of the distal end of the inner link 103 abuts against the mounting arm 73 preventing forward pivoting of the mounting arm 73 away from the tire 16, until the inner linkage 103 is pivoted forward and out of the over center condition. In the embodiment shown, an outer edge of the upper and lower ears 109 and 110 of inner link 103 abuts against forward edges of upper and lower legs 121 and 123 of the brake pad mounting arm 73 when the over center linkage 101 is pivoted to the over center condition.

The spacing of the feet 84 of the brake pad 71 relative to the brake pad mounting arm 73 is adjustable, by rotation of the brake pad 71 relative to the mounting arm 73, so that when the mounting arm 73 is pivoted to the engaged position with the linkage 101 in the over center condition, the feet 84 of the brake pad 71 are pressed against the surface of the tire tread 86 under sufficient pressure or force or to a sufficient degree to resist rotation of the tire 16. The brake 11 is released from the engaged position described by pivoting the lever arm 116 and inner link 103 forward to pivot the brake pad mounting arm 73 and attached brake pad 71 forward and away from the tire 16.

Figure 7:
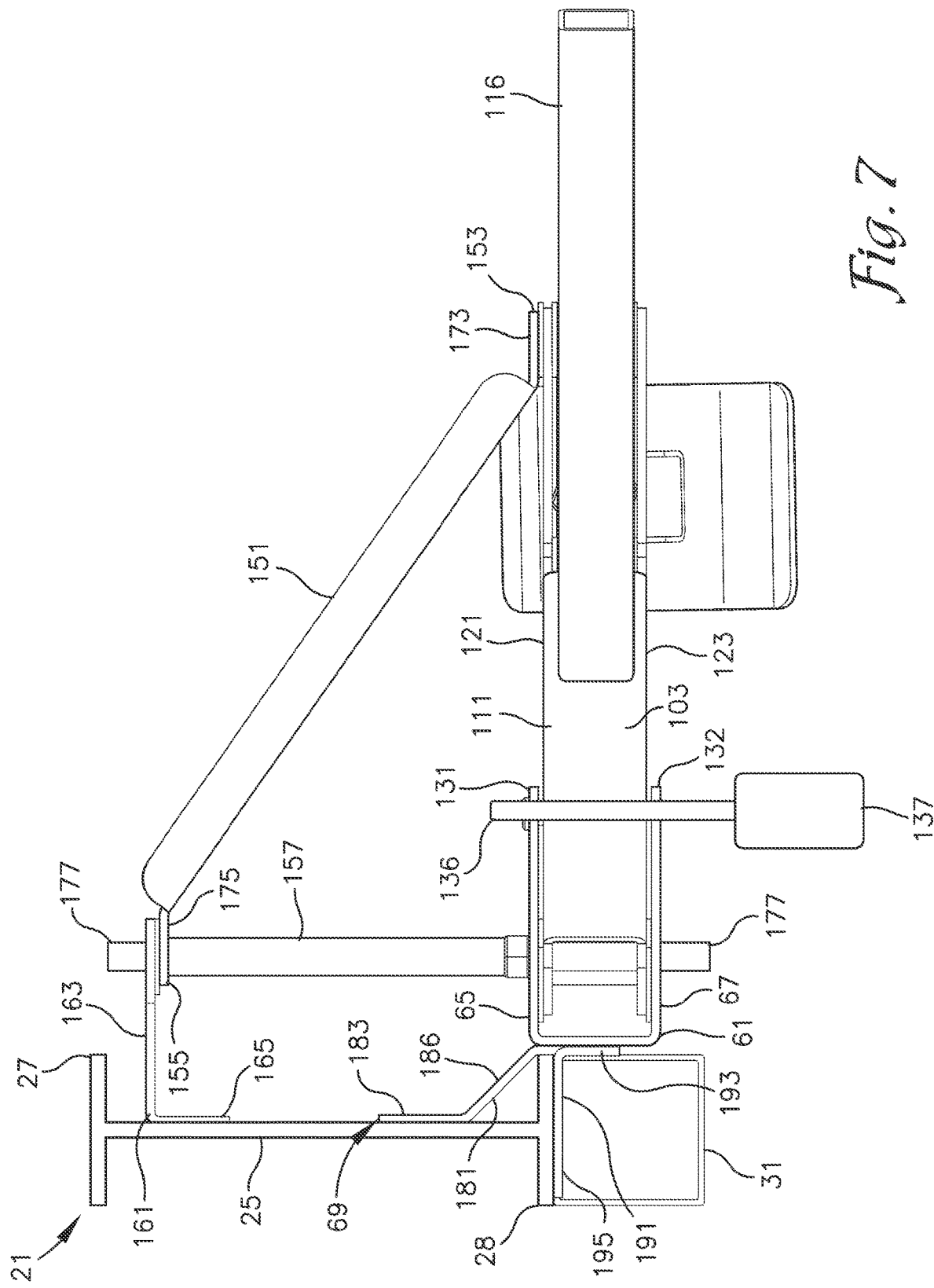
FIG. 7 is an end view of the tire engaging brake secured to the frame as in FIG. 6 looking rearward.
Figure 8:
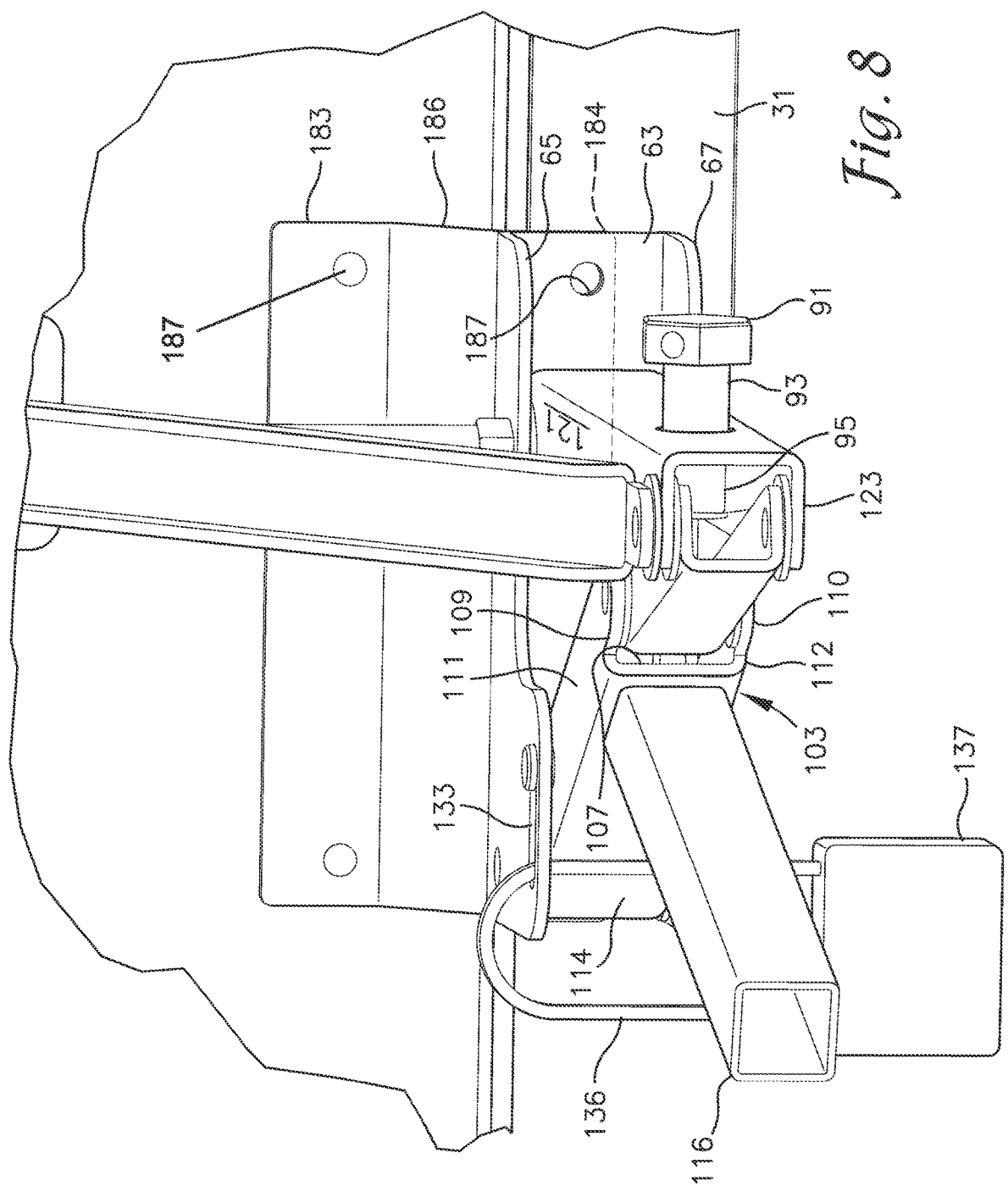
FIG. 8 is an enlarged perspective view of the tire engaging brake as shown in FIG. 5 looking inward from a side of the frame and with a brake pad for the tire engaging brake removed to show more detail thereof.

As best seen in FIGS. 2, 3 and 7, upper and lower lock receiving tabs 131 and 132 are formed as part of or secured to and extend outward from or relative to the upper and lower legs 65 and 67 of the base channel 61 proximate the forward ends thereof and over and under at least a portion of a path of rotation of the inner link 103. In the embodiment shown, vertically aligned slots 133 and 134 are formed through the tabs 131 and 132. A longitudinal axis of each slot 133 and 134 extends parallel with the longitudinal axis of the web 63 of the base channel 61. The slots 133 and 134 are wide enough to receive a shackle 136 of a padlock 137 or a pin 138 of a wire lock pin, a shortened version of which is shown in FIG. 2. As used herein, the shackle 136 of the padlock may be referred to as a pin.

Referring to FIG. 3, a forward portion of each slot 133 and 134 is positioned so that when the brake pad mounting arm 73 and over center linkage 101 are pivoted to the engaged position with the over center linkage in the over center condition, the forward portion of each slot 133 and 134 extends forward from a forward facing surface of the inner link 103 a distance sufficient to insert the shackle 136 of the padlock 137 through the forward portions of the aligned slots 133 and 134. Insertion of the shackle 136 through the forward portions of the aligned slots 133 and 134 forward of the inner link 103 prevents forward rotation of the inner link 103 out of the over center condition with the outer link 105 and prevents advancement of the brake pad 71 out of engagement with the tire 16 so that the padlock 137 can be used to lock the tire brake 11 in engagement with the tire 16 to deter theft of the trailer.

Referring to FIG. 2, a rear portion of each slot 133 and 134 is positioned so that when the brake pad mounting arm 73 and over center linkage 101 are pivoted to the retracted position, the rear portion of each slot 133 and 134 extends rearward from a rearward facing surface of the brake pad mounting arm 73 a distance sufficient to insert the pin 138 through the rear portions of the aligned slots 133 and 134. Insertion of the pin 138 through the aligned slots 133 and 134 rearward of the mounting arm 73 prevents rearward rotation of the brake pad mounting arm 73 and brake pad 71 out of the retracted position and prevents inadvertent advancement of the brake pad 71 into engagement with the tire 16 while the trailer is moving or rolling.

Vertical deflection of the brake pad mounting arm 73 and the brake pad 71 is prevented or resisted by a diagonal brace 151 having an outer end 153 connected to the distal end 75 of the brake mounting pad arm 73 in closely spaced relation thereto and an inner end 155 spaced above the inner end 77 of the brake mounting pad arm 73 by a vertical spacer 157. The inner end 155 of the diagonal brace 151 is pivotally connected to a frame mounting bracket or angle bracket 161 which is also supported above the inner end 77 of the brake pad mounting arm 73 by the vertical spacer 157.

The frame mounting bracket 161 (FIG. 5) includes a horizontal leg 163 and a vertical leg 165. The inner end 155 of diagonal brace 151 is pivotally connected to the horizontal leg 163. The vertical leg 165 of the frame mounting bracket 161 is sized and spaced away from the inner end 155 of the diagonal brace 151 to position the vertical leg 165 against the vertical web 25 of the trailer frame beam 21. Screw holes 167 (one of which is shown in FIG. 5) are formed in the vertical leg 165 of the frame mounting bracket 161 to receive metal screws for securing the frame mounting bracket 161 to the web 25 of beam 21. It is foreseen that the frame mounting bracket 161 could be formed in other shapes and could be positioned to be secured to upper flange 27 of the beam 21.

In the embodiment shown, the diagonal brace 151 is formed as a channel member having a central web 171 and upwardly extending legs 172. First and second or outer and inner mounting tabs 173 and 175 are formed on the outer end 153 and inner end 155 respectively of the diagonal brace 151. The outer mounting tab 173 is bolted to the distal end 75 of brake pad mounting arm 73 by a bolt (not shown) about which the distal end of outer link 105 pivots. The inner mounting tab 175 is supported on the upper end of the vertical spacer 157. In the embodiment shown, the vertical spacer 157 comprises a rigid tube which surrounds an all-thread rod 177 which extends through the horizontal leg 163 of frame mounting bracket 161, through the inner mounting tab 175 of diagonal brace 151, through the vertical spacer 157, through the upper and lower legs 65, 67 of the base channel 61 and through the inner end 77 of the brake pad mounting arm 73 extending between the upper and lower legs 65, 67 of base channel 61. The inner end 155 of diagonal brace 151 and the inner end 77 of the brake pad mounting arm 73 pivot about rod 177 and relative to the frame mounting bracket 161 and base channel 61, respectively, to allow the brake pad mounting arm 73 and the diagonal brace 151 connected thereto to be pivoted between the retracted and extended positions.

The base channel 61 is supported to extend at least partially below the beam 21 by the brake mounting assembly 69. In the embodiment shown, the brake mounting assembly 69 includes a Z-shaped bracket 181 including upper and lower vertical flanges or feet 183 and 184 interconnected by an angled web 186 (see FIG. 5). The channel web 63 of base channel 61 is secured against the lower flange 184 of bracket 181 with front and rear sets of aligned holes 187 extending through the channel web 63 and the lower flange 184. In the installation shown, a metal screw can be driven through the rear set of aligned holes 187 and into the outer face of the suspension support tube 31, and an angle bracket 191 (see FIG. 4) may be bolted to and against the inner face of the lower flange 184 of Z-shaped bracket 181 by a bolt (not shown) extending through the front set of aligned holes 187 in the channel web 63 and the lower flange 184. The bolt extends through a vertical leg 193 of the angle bracket 191 positioned against the lower flange 184, and a horizontal leg 195 of the angle bracket 191 is positionable against a bottom surface of the lower flange 28 of beam 21. A metal screw driven upward through a hole in the horizontal leg 195 of angle bracket 191 may be used to secure the angle bracket 191 to the lower flange 28 of the beam 21. In some applications, a second angle bracket 191 (not shown) may be secured to the inner surface of the lower flange 184 with a bolt extending through the rear set of aligned holes 187 for securing to the bottom of the beam 21 for frames not including a suspension support tube 31 or if the rear set of aligned holes 187 in the base channel 61 and lower flange 184 can be positioned forward of the suspension support tube 31.

As mentioned previously and with reference to FIG. 7, the angle bracket 191 and Z-shaped bracket 181 connect the base channel 61 to the beam 21 so that the upper leg 111 of inner link 103 connected to base channel 61 generally extends in planar alignment with the lower flange 28 of the beam 21, and an upper surface of the lever arm 116 extends below the upper leg 111 of the inner link 103 to which it is connected. When the brake pad mounting arm 73 and over center linkage 101 are pivoted to the retracted position, at least a portion of the lever arm 116 can be advanced under the beam 21.

The angled web 186 of the Z-shaped bracket 181 slopes upward and inward from the lower flange 184 to space the upper flange 183 against the web 25 of beam 21 when the angle bracket 191 secured against the lower flange 184 is secured to the bottom of the beam 21. Metal screws or other fasteners may be driven through holes formed in opposite ends of the upper flange 183 to secure the upper flange 183 to the web 25 of the beam 21.

Instead of using a suspension support tube 31 for connecting a suspension to a trailer frame assembly 12, it is known to reinforce the lower flange 28 of a beam 21 by welding a flat piece of steel from the outer edge of the flange 28 upward to the web 25 at an acute angle of less than forty-five degrees. The angled web 186 of the Z-shaped bracket 181 extends at an angle that either matches or is slightly steeper than the angle of a reinforcement plate so that the Z-shaped bracket 181 may be secured to the beam over the reinforcement plate.

It is also foreseen that a brake mounting plate may be welded to the trailer frame or beam 21 with holes or horizontally extending slots formed in a mounting surface of the mounting plate for bolting the base channel 61 to the mounting surface. The mounting plate may be sized to also permit bolting of the frame mounting bracket 161 for the diagonal brace 151 thereto. The mounting plate could be welded in place on all of its trailers to facilitate installation of the tire brake 11 as either optional original equipment or as a subsequently purchased accessory. A mounting plate having a slotted mounting surface would allow adjustment of the longitudinal positioning of the tire brake 11 during installation to ensure an acceptable braking pressure can be applied to the tire 16 engaged by the brake.

Figure 14:
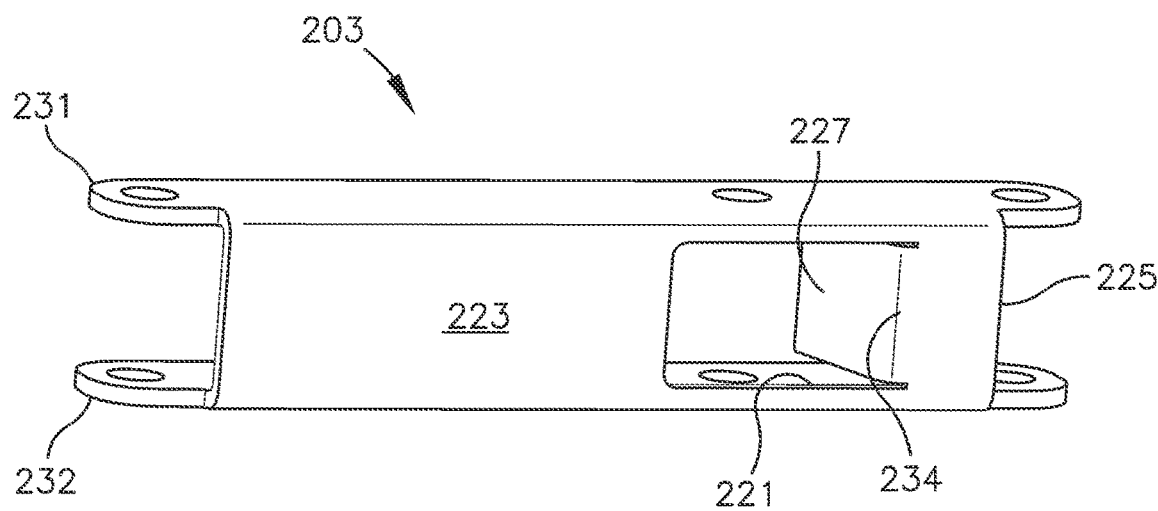
FIG. 14 is a perspective view of an inner link of an over-center linkage of the tire engaging brake as shown in FIG. 9 looking rearward at the linkage.
Figure 15:
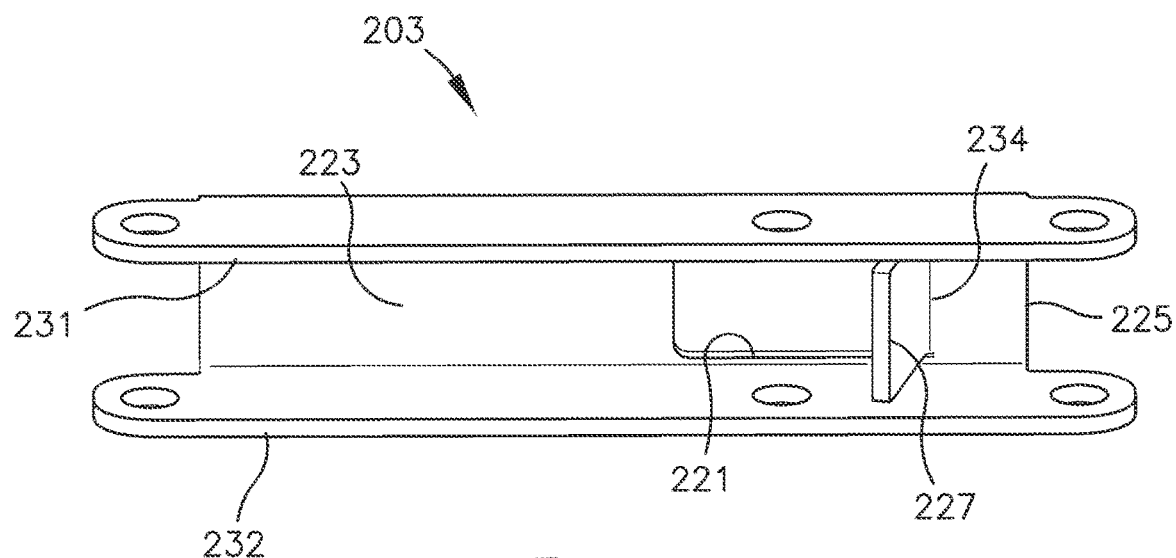
FIG. 15 is a perspective view of the inner link of the over-center linkage of the tire engaging brake as shown in FIG. 14 but looking forward toward the linkage.

FIGS. 9-13 show a modified embodiment of the tire brake 201 as shown in FIGS. 1-8 having a lever arm 216 that is pivotally connected to a modified inner link 203 of the over center linkage 101. The modified inner link 203 is shown isolated in FIGS. 14 and 15. Components and assemblies in tire brake 201 that are not specifically modified with respect to components and assemblies in tire brake 11 are identified with the same reference numbers as in tire brake 11. A pivot slot 221 is formed in a central web 223 of the inner link 203 proximate a distal end 225 thereof adjacent the pivotal connection between the inner link 203 and the outer link 105. A support member or reinforcing tab 227 extends between upper and lower legs 231 and 232 respectively of the modified inner link 203 along an outer edge 234 of the pivot slot 221. Inner link 203, along with other components of the tire brake 11 may be formed from sheet metal with the reinforcing tab 227 formed by bending a portion of the central web 223 inward from an outer face of the central web 223 and between the upper and lower legs 231 and 232 of inner link 203. In the embodiment shown, the reinforcing tab 227 may be bent inward between approximately seventy-five to ninety degrees relative to a plane extending across the outer face of the central web 223. The lever arm 216 is pivotally mounted to the inner link 203 by and on a pivot pin 235 secured to and extending between the upper and lower legs 231 and 232 of the inner link 203.

An abutment surface 241 is incorporated into or secured to the brake pad mounting arm 73 between the upper and lower legs 121 and 123 of the channel member forming the brake pad mounting arm 73 with the abutment surface 241 extending in approximate planar alignment with forward ends of the upper and lower legs 121 and 123. In the embodiment shown, the abutment surface 241 comprises a planar face of a section of square tubing 245 that is secured between the upper and lower legs 121 and 123 respectively of mounting arm 73. The section of square tubing 245 may be secured in the mounting arm 73 by screws (not shown) extending through the mounting arm 73 and into the square tubing 245 or by welding, adhesives or other securement means. The abutment surface 241 may also be formed as a face of a solid block secured to the mounting arm 73 or as a plate welded across or between the inner ends of the upper and lower legs 121 and 123.

Figure 9:
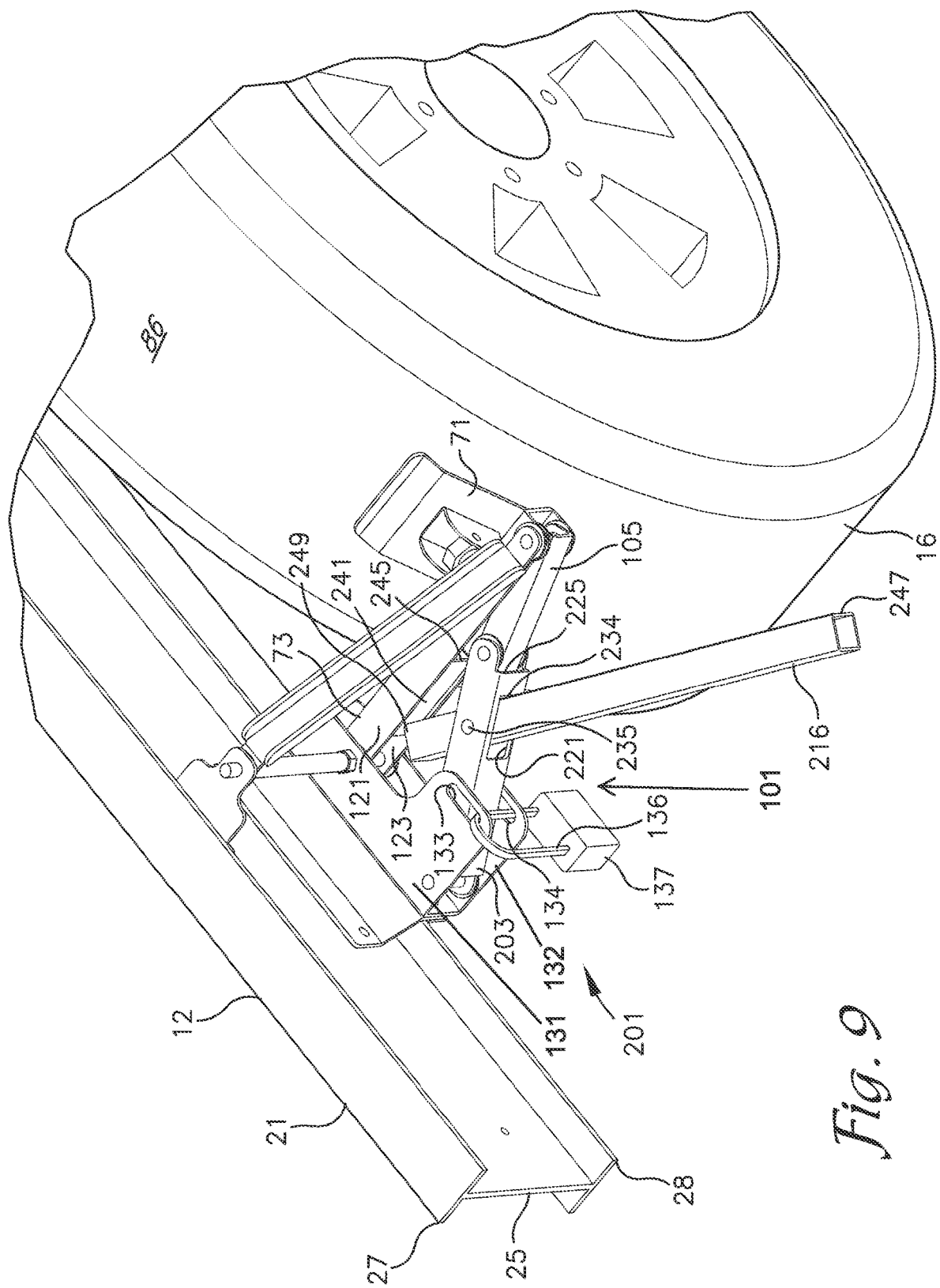
FIG. 9 is a front, top perspective view of an alternative embodiment of the tire engaging brake as in FIG. 1 showing a pivotal lever arm pivotally connected to an inner link of an over-center linkage and showing the over-center linkage in an over-centered condition holding a brake pad on a brake pad mounting arm against a tire.
Figure 10:
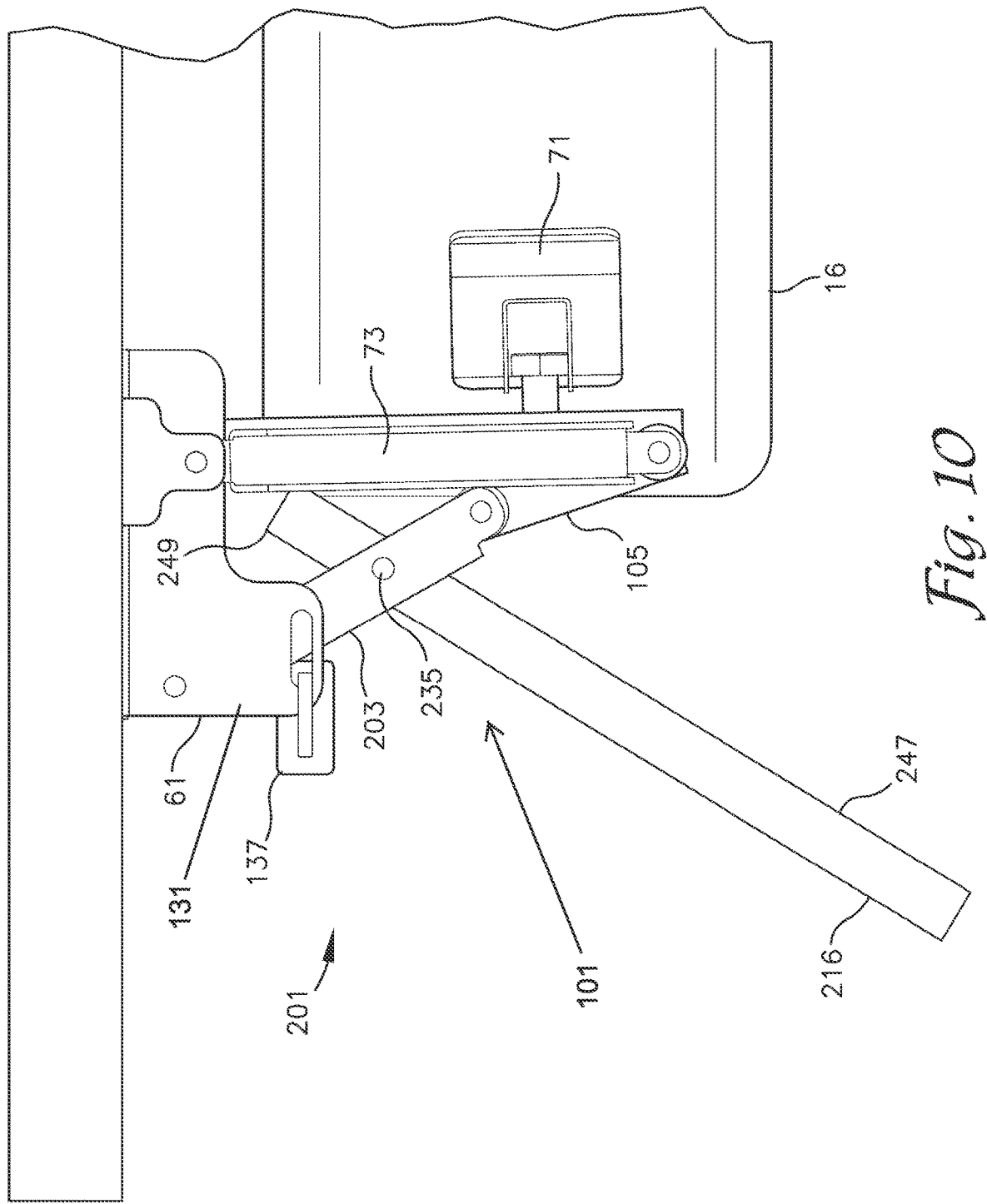
FIG. 10 is a top plan view of the tire engaging brake as shown in FIG. 9 in the tire engaging position.
Figure 11:
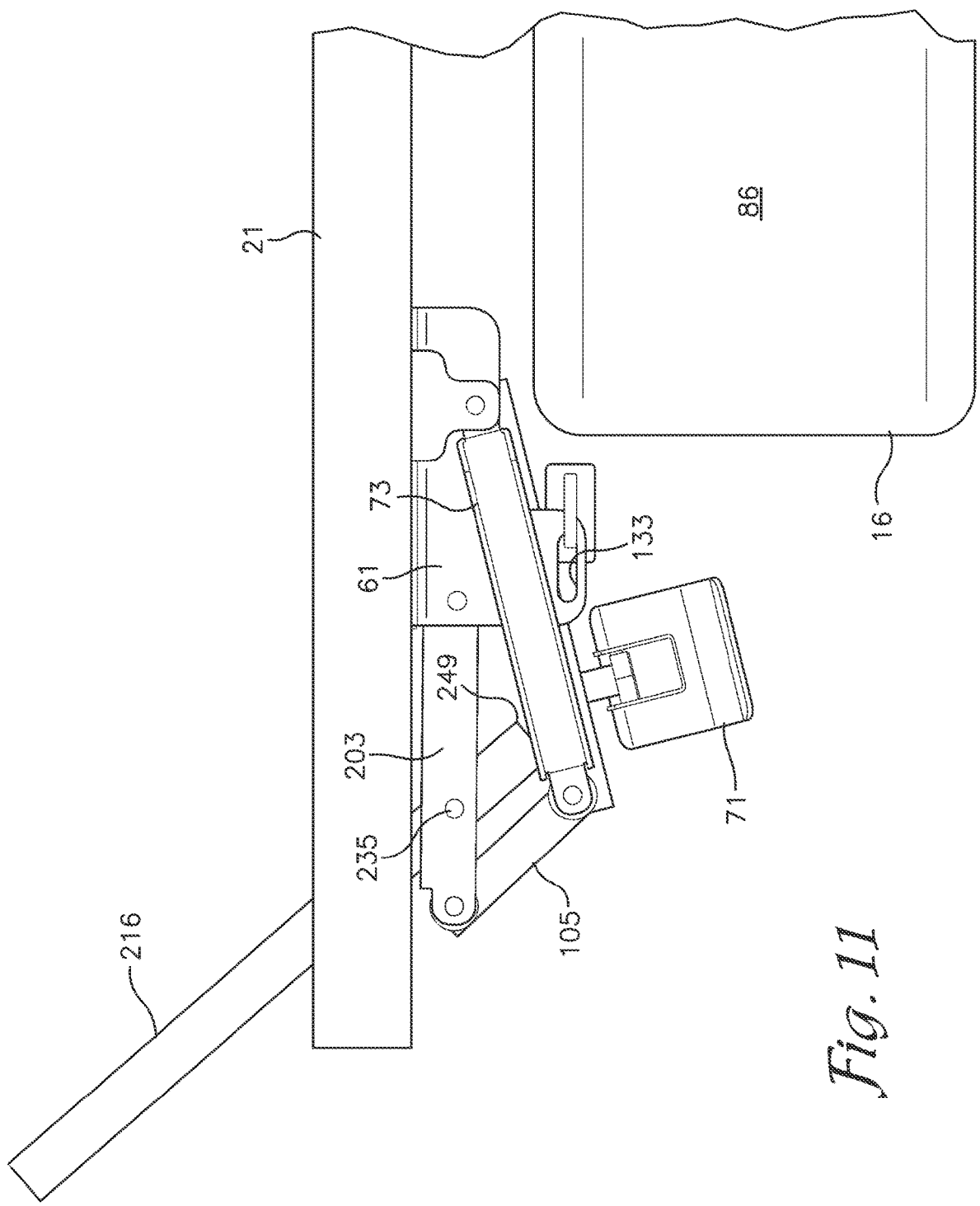
FIG. 11 is a top plan view of the tire engaging brake as shown in FIG. 9 in the retracted position with the brake pad withdrawn from engaging the tire.
Figure 12:
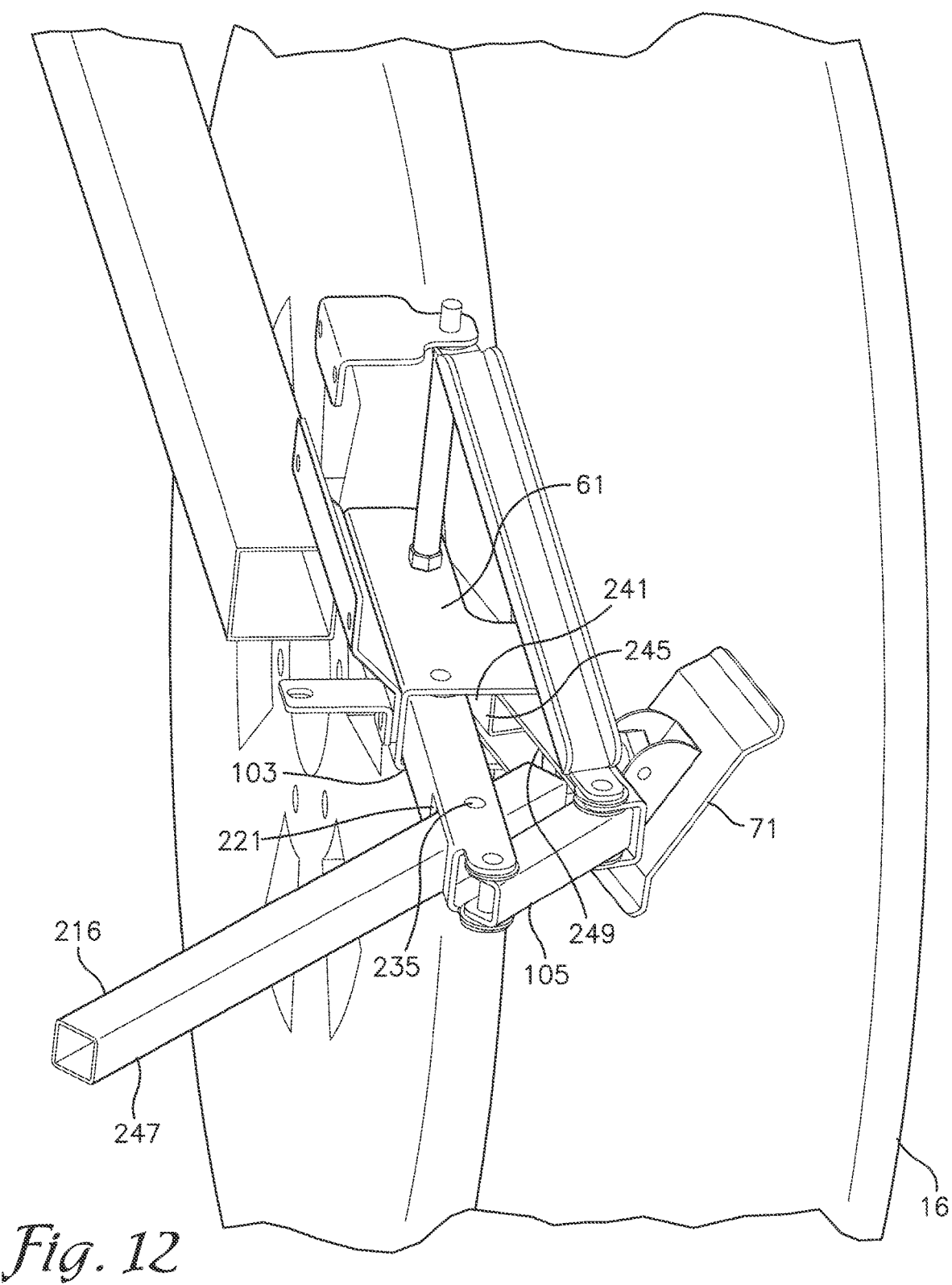
FIG. 12 is a top, perspective view of the tire engaging brake of FIG. 9 in the retracted position viewed looking outward relative to a trailer frame on which the tire engaging brake is mounted.
Figure 13:
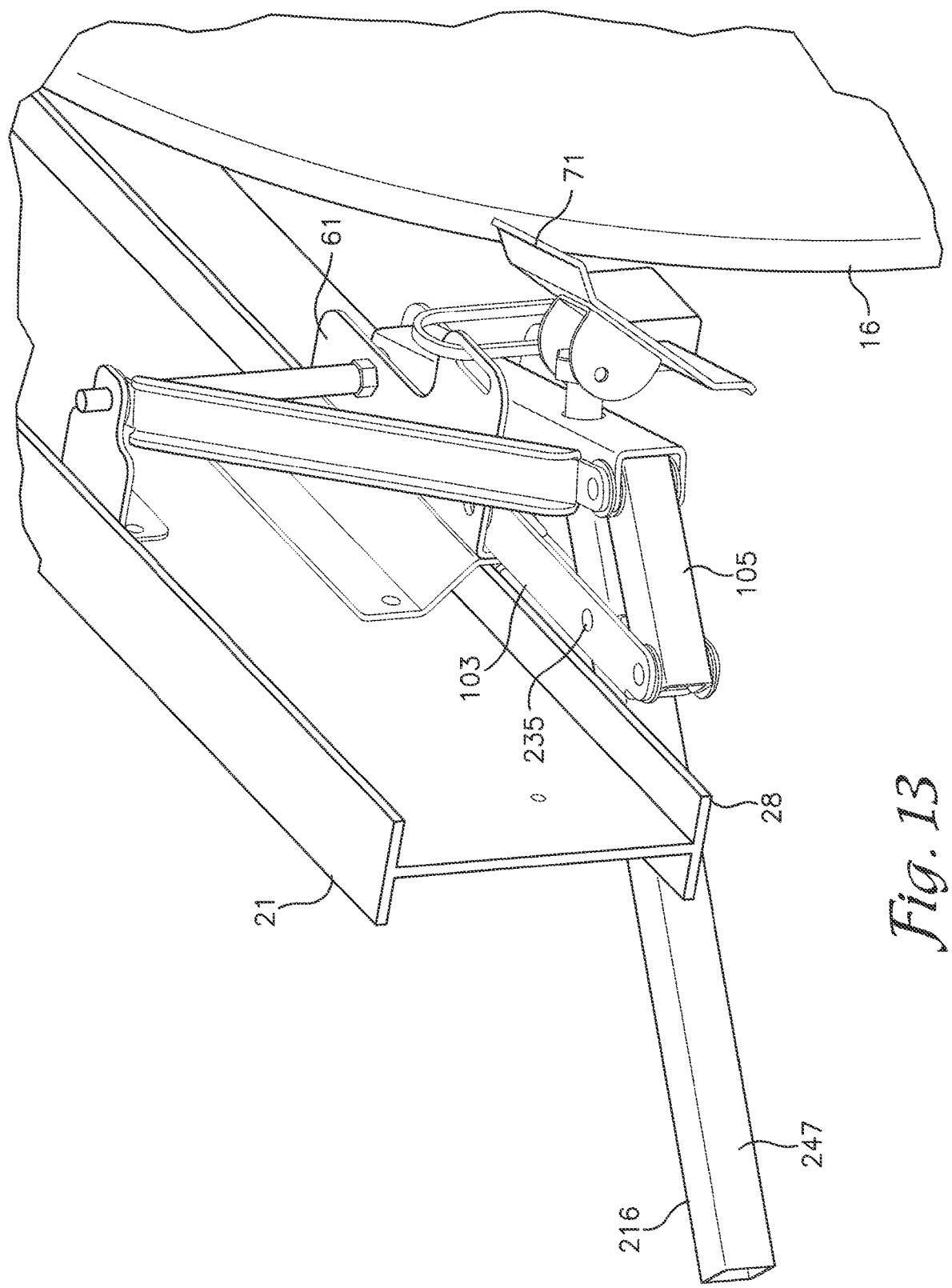
FIG. 13 is a top, perspective view of the tire engaging brake of FIG. 9 in the retracted position viewed looking inward relative to a trailer frame on which the tire engaging brake is mounted.

The modified tire brake 201 is shown in the engaged position in FIGS. 9 and 10 with brake pad 71 engaging the tread 86 of a tire 16. The modified brake 201 is shown in a retracted position in FIGS. 11-13 with the brake pad 71 withdrawn from engaging the tread 86 of tire 16 and the lever arm or handle 216 extending under lower flange 28 of beam 21. To advance the brake 201 from the retracted position to the engaged position, an operator grasps the lever arm 216 and pulls the lever arm 216 outward and rearward to pivotally advance the brake pad 71 into engagement with the tire tread 86 and until the inner link 203 and outer link 105 advance into an over-center condition to lock the brake pad mounting arm 73 in place. As the lever arm 216 is pulled outward and rearward, the lever arm 216 pivots about pivot pin 235 within pivot slot 221 until an outer face 247 of the lever arm 216 abuts against the outer edge 234 of the pivot slot 221. Thereafter, further outward and rearward pivoting of the lever arm 216 engaging the outer edge 234 of pivot slot 221 pivots the inner link 203 outward and rearward advancing the outer link 105 and the brake pad mounting arm 73 outward and rearward until the brake pad mounting arm 73 advances the brake pad 71 into the tread 86 of the tire 16 and the inner link 203 and outer link 105 are advanced into the over-center condition.

To advance the inner link 203 and outer link 105 out of the over-center condition and to advance the brake pad 71 out of engagement with the tire 16, the lever arm 216 is pivoted forward and inward about pivot pin 235 and within pivot slot 221 until an inner end 249 of the lever arm 216 abuts against the abutment surface 241 of the square tubing 245 secured to brake pad mounting arm 73. Abutment of the inner end 249 of the lever arm 216 against the abutment surface 241 provides a fulcrum or leverage to use the lever arm 216 to pivot the inner link 203 out of the over-center condition with outer link 105. Further forward and inward pivoting of the lever arm 216 pivots the brake pad mounting arm 73 and the attached brake pad 71 forward and out of engagement with the tire 16. The slots 133 and 134 formed in the upper and lower legs 131 and 132 of the base channel 61 are adapted to receive the shackle 136 of a padlock 137 or a pin (not shown) for securing the lever arm 216 in either the engaged or retracted position as described previously.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

The invention claimed is:

1. A tire engaging parking brake for use with a vehicle having a vehicle frame supporting a tire from a suspension, the tire engaging parking brake comprising:
   a base securable to the vehicle frame;
   a brake pad mounting arm pivotally connected at an inner end to the base;

a brake pad connected to the brake pad mounting arm adjacent an outer end of the brake pad mounting arm;

an over-center linkage including an inner link connected at an inner end to the base at a position forward of the pivotal connection of the brake pad mounting arm to the base, and an outer link pivotally connected at an inner end to the inner link and pivotally connected at an outer end to a distal end of the brake pad mounting arm; and a lever arm cooperable with the inner link for pivoting the inner link, the outer link and the brake pad mounting arm between a retracted position and a tire engaging position in which the inner link and the outer link extend in an over-center condition, wherein the base comprises a U-shaped channel oriented sideways including a channel web, an upper leg extending from the channel web, and a lower leg extending from the channel web.

2. A tire engaging brake according to claim 1, further comprising a diagonal brace connected at an outer end to the brake pad mounting arm proximate a distal end thereof and pivotally connected at an inner end to a frame mounting bracket securable to the frame above the inner end of the brake pad mounting arm.

3. A tire engaging brake according to claim 2, wherein the inner end of the diagonal brace is supported in spaced relation above the inner end of the brake pad mounting arm by a spacer surrounding a pivot rod around which the inner end of the brake pad mounting arm is pivotally connected to the base.

4. A tire engaging brake according to claim 1, wherein the lever arm is coupled with the inner link of the over-center linkage.

5. A tire engaging brake according to claim 4, wherein the lever arm is pivotally coupled with the inner link of the over-center linkage.

6. A tire engaging brake according to claim 1, wherein the lever arm is coupled with the inner link of the over-center linkage via a pivot pin and extends through the inner link toward the brake pad mounting arm.

7. A tire engaging brake according to claim 6, wherein the brake pad mounting arm comprises an abutment surface on a side thereof facing the over-center linkage, and wherein in the tire engaging position, the lever arm engages the abutment surface of the brake pad mounting arm.

8. A tire engaging brake according to claim 7, wherein a distal end of the lever arm is engageable by a user and movable in a first direction for pivoting the inner link and the outer link and the brake pad mounting arm connected thereto from the retracted position to the tire engaging position, and wherein pivoting the lever arm in a second direction, when the inner link, outer link and brake pad mounting arm are in the tire engaging position, pivots an inner end of the lever arm against the abutment surface of the brake pad mounting arm to facilitate pivoting of the inner link out of the over-center condition and toward the retracted position.

9. A tire engaging brake according to claim 1, wherein the upper leg and the lower leg of the base comprise vertically aligned slots therein, and wherein the slots are positioned to be outward of the inner link of the over-center linkage when the over-center linkage is in the tire engaging position.

10. A tire engaging brake according to claim 1, wherein the base is securable to the vehicle frame such that the lever arm is pivotal below the vehicle frame when the brake pad mounting arm, the inner link and the outer link are pivoted to the retracted position.

11. A tire engaging brake according to claim 1, further comprising at least one pin receiver formed in the base and sized to receive a pin therethrough, the at least one pin receiver being positioned to extend forward of the inner link when the inner link is pivoted to the tire engaging position, and wherein positioning of a pin through the at least one pin receiver forward of the inner link prevents pivoting of the inner link, the outer link, the brake pad mounting arm and the brake pad connected thereto out of the tire engaging position.

12. A tire engaging brake according to claim 11, wherein the at least one pin receiver is positioned to extend rearward of the brake pad mounting arm when the brake pad mounting arm is pivoted to the retracted position, and wherein positioning of a pin through the at least one pin receiver rearward of the brake pad mounting arm in the retracted position prevents pivoting of the inner link, the outer link, the brake pad mounting arm and the brake pad connected thereto into the tire engaging position.

13. A tire engaging brake according to claim 12, wherein the at least one pin receiver comprises a slot.

14. A tire engaging parking brake for use with a vehicle having a vehicle frame supporting a tire from a suspension, the tire engaging parking brake comprising:

a base securable to the vehicle frame;

a brake pad mounting arm pivotally connected to the base at a first pivot point;

a brake pad connected to the brake pad mounting arm;

an over-center linkage including an inner link pivotally connected at an inner end to the base at a second pivot point spaced from the first pivot point, and an outer link pivotally connected at an inner end to the inner link and pivotally connected at an outer end to the brake pad mounting arm; and a lever arm cooperable with the inner link for pivoting the inner link, the outer link and the brake pad mounting arm between a retracted position and a tire engaging position in which the inner link and the outer link extend in an over-center condition, wherein the first and second pivot points are positioned such that the brake pad mounting arm and the inner link are pivoted from an inner face side of the tire in the retracted position toward an outer face side of the tire in the tire engaging position.

15. A tire engaging brake according to claim 14, wherein the lever arm is fixed to the inner link.

16. A tire engaging brake according to claim 14, wherein the lever arm is pivotally coupled with the inner link.

17. A tire engaging brake according to claim 16, wherein the lever arm is pivotally coupled with the inner link via a pivot pin and extends through the inner link toward the brake pad mounting arm.

18. A tire engaging brake according to claim 17, wherein the brake pad mounting arm comprises an abutment surface on a side thereof facing the over-center linkage, and wherein in the tire engaging position, the lever arm engages the abutment surface of the brake pad mounting arm.

\* \* \* \* \*